J. DE YOUNG.
CHICKEN CRATING APPARATUS.
APPLICATION FILED JAN. 21, 1910.
959,121.
Patented May 24, 1910.
2 SHEETS—SHEET 1.
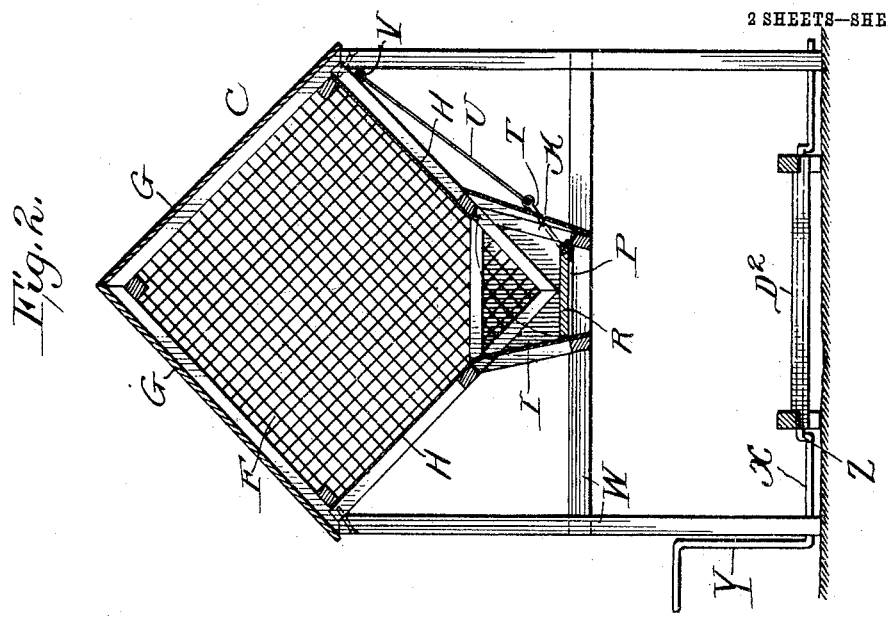
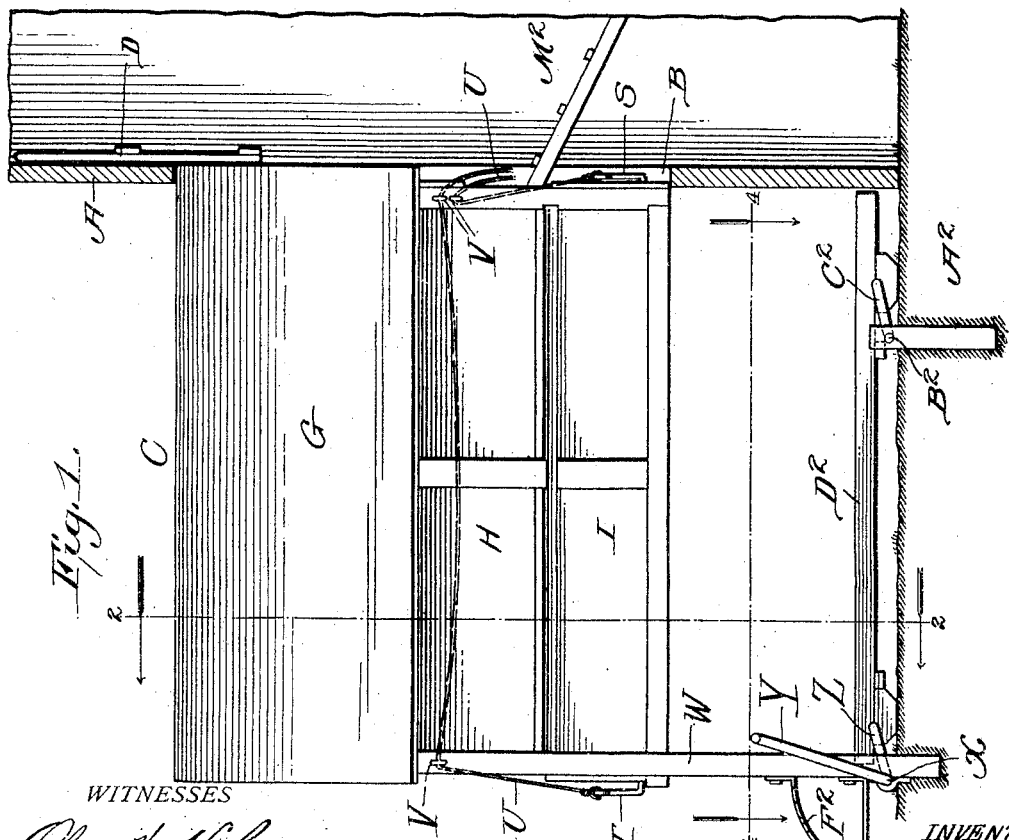

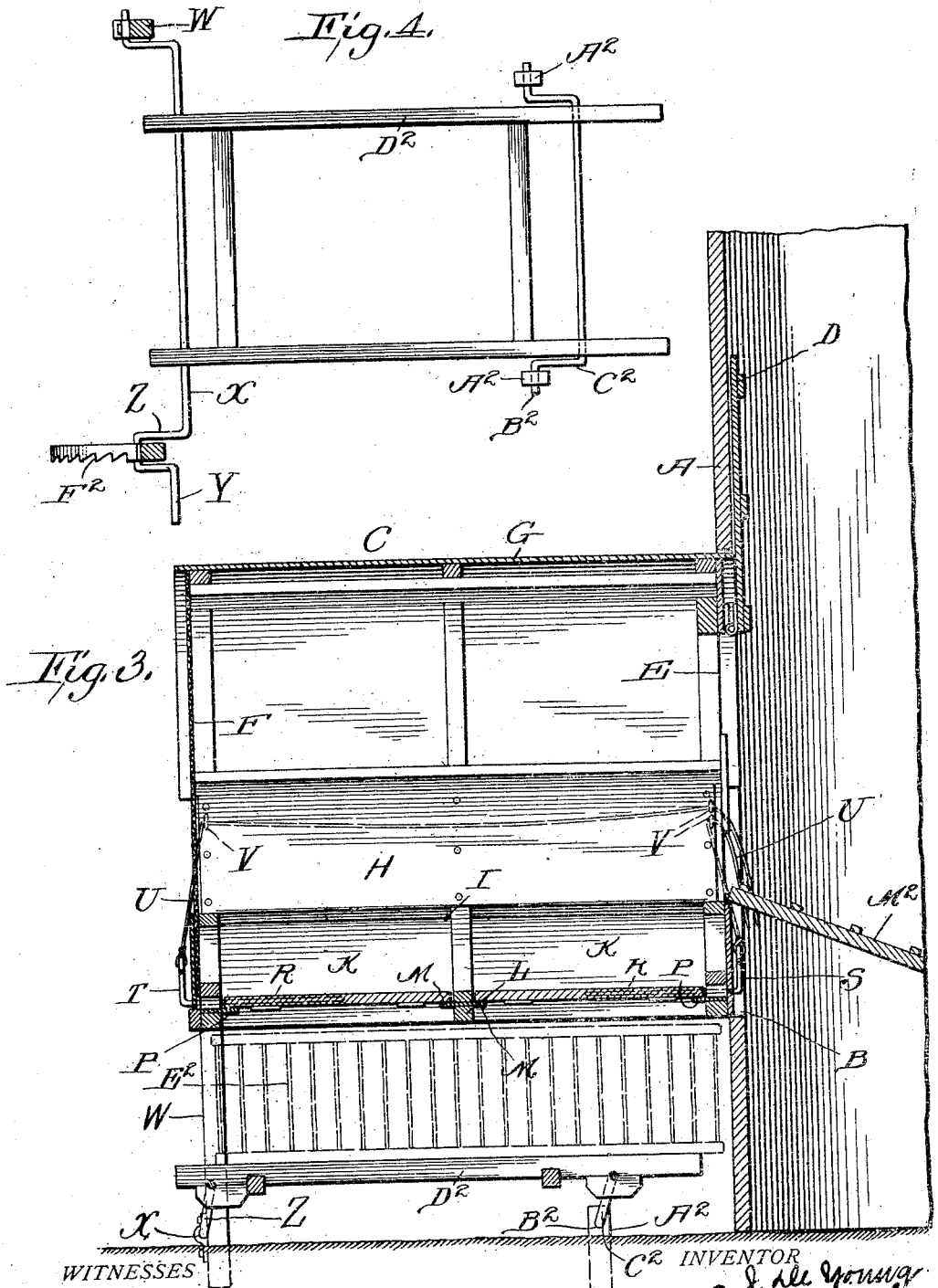

UNITED STATES PATENT OFFICE.

JAMES DE YOUNG, OF MANHATTAN, KANSAS.

CHICKEN-CRATING APPARATUS.

959,121. Specification of Letters Patent. Patented May 24, 1910.

Application filed January 21, 1910. Serial No. 539,389.

*To all whom it may concern:*

Be it known that I, JAMES DE YOUNG, citizen of the United States, residing at Manhattan, in the county of Riley and State of Kansas, have invented new and useful Improvements in Chicken-Crating Apparatus, of which the following is a specification.

My invention has to do with the putting of chickens and the like in shipping crates or coops; and it has for one of its objects to provide a simple, easily controlled and efficient apparatus through the medium of which chickens may be expeditiously transferred from a chicken house or the like to a crate or coop, and this without liability of the chickens being bruised or otherwise injured.

Another object of the invention is the provision of a chicken-transfer apparatus embodying simple and efficient means for moving and holding a crate or coop against its discharge.

My invention will be best understood by reference to the following description when taken in connection with the accompanying illustration of one specific embodiment thereof, while its scope will be more particularly pointed out in the appended claims.

In the drawings which are hereby made part hereof: Figure 1 is a view showing my apparatus in side elevation as properly arranged relative to a chicken house. Fig. 2 is a transverse section on line 2—2 of Fig. 1. Fig. 3 is a longitudinal vertical section taken through the apparatus and showing the manner in which the same is put in communication with the chicken house. Fig. 4 is a section on line 4—4 of Fig. 1, and showing the crate or coop positioning means.

Similar letters designate corresponding parts in all of the views of the drawings, referring to which:

A is a wall of a chicken house, in which is formed an opening B, and C is the body of my novel crating or cooping apparatus which in the present and preferred embodiment of my invention is of a shape in cross-section corresponding to that of the opening B. The said body C is preferably put in communication with the chicken house by arranging its inner end in the opening B and opening its door D, as shown in Figs. 1 and 3. I would also have it understood that when deemed expedient the receiving end of the apparatus may be suitably connected with the house wall A, but this I have regarded it unnecessary to illustrate.

The body C is provided at its inner end with an opening E designed to be controlled by the said door D, and its outer end is closed by reticulated or other open-work material F, calculated to admit light to its interior. The top G of the body is closed, and at opposite sides of its bottom said body is provided with downwardly and inwardly inclined side walls H, preferably of sheet-metal, which extend throughout its length. The bottom of the body C is formed by a longitudinal, depending trough I, which is open at top and bottom and closed at its end and is provided in one side with recesses or offset portions K, Figs. 2 and 3. The opening at the bottom of the trough is preferably divided by a transverse bar L on which are ledges M, designed to serve in combination with end ledges P, Fig. 3, in supporting in their horizontal positions the doors R of which two are preferably employed. When raised to permit downward passage of chickens through the trough I, the doors R are received in the recesses or offset portions K, and hence do not in any measure interfere with the said downward passage. At the inner end of the door R is connected a crank S movable with the door, and at the outer end of the other door R is a similar crank T. The said cranks S and T are connected to cables U, and the said cables are carried through guide eyes V or other suitable guides to a point where they can be conveniently reached by an operator located within the chicken house, this in order to enable the operator to conveniently draw the cables and close the doors R when the proper number of chickens have passed through the body C of the apparatus.

The outer end of the body C is supported by a suitable frame W, and in the uprights of said frame is journaled a shaft X having at one end a crank handle Y and also having at an intermediate point of its length a crank portion Z.

Journaled in uprights $A^2$ suitably fixed in the ground is a shaft $B^2$ which has a crank portion $C^2$, and connected to the crank portions Z and $C^2$ is a frame $D^2$ on which a crate or coop $E^2$, see dotted lines in Fig. 3, may be raised to a position against or adjacent the under side of the trough I. The crate E² is of the two-compartment type generally used, and the two doors R are provided in order to coöperate with the two compartments of the crate. From this it follows that when a crate or crates of the single compartment type are employed, but a single door R need be employed, which door, of course, will extend throughout the length of the trough I.

For the purpose of holding the frame D² in its raised position and enabling said frame to hold a crate or coop against the under side of the trough I, I provide the segmental rack F² fixed to one of the uprights of the frame W in position to coöperate with the crank handle Y.

In the practical use of my novel apparatus, a crate is held against the under side of the trough I, as shown in Fig. 3, and the door D of the body C is maintained in an open position, this while the doors R in the trough I are also open. Chickens are then driven up the inclined plane M² in the chicken house and into the body C of the apparatus, whereupon they will either pass directly down through the trough I, or else will fly and light on the inclined side H, and then slide into and through the trough I and into the coop. When the desired number of chickens are in the crate compartment nearest the chicken house, the door R above said compartment is closed, and when the proper number of chickens are in the other compartment of the crate, the other door R is closed. The frame D² is then lowered for the removal of the crate, and an empty crate is placed on the said frame D² and raised against the trough I, whereupon the doors R are opened for a repetition of the operation described. When the crating of chickens is completed, the door D may be and preferably is closed with a view of preventing the passage of chickens from the chicken house into the body C.

While I have shown and described one form of my invention, it is to be understood that I am not limited to the details or the form or relative arrangement of parts disclosed, but that extensive modifications may be made therein without departing from the spirit thereof.

Having described my invention, what I claim and desire to secure by Letters-Patent, is:

1. In an apparatus for the purpose described, the combination with a body having an opening at one end for connecting its interior with that of a chicken house, and also having a trough at its bottom that is open at its top and bottom and closed at its ends and is provided at one side with an offset portion, and further having side walls inclined inward and downward to the said trough; of a door hinged in the trough and arranged when opened to occupy the said offset portion.

2. In an apparatus for the purpose described, the combination with a body having an opening at one end for connecting its interior with that of a chicken house and also having an opening in its bottom through which chickens can pass into a crate or coop positioned below the body; of a door movable in the body for controlling the latter opening.

3. In an apparatus for the purpose described, the combination with a body having an opening at one end for connecting its interior with that of a chicken house and also having an opening in its bottom through which chickens can pass into a crate or coop positioned below the body; of a door connected with the body, for controlling the first-named opening, and a door movable in the body for controlling the latter opening.

4. In an apparatus for the purpose described, the combination with a body having an opening at one end for connecting its interior with that of a chicken house, and also having a trough at its bottom that is open at its top and bottom and closed at its ends and is provided at one side with a recess or offset portion; of a door hinged in the trough and arranged when opened to occupy the said recess or offset portion.

5. An apparatus for the purpose described, comprising a body having an opening at one end for connecting its interior with that of a chicken house and also having an opening in its bottom through which chickens may pass into a crate or coop positioned below the body; and means connected with the said body for moving and holding a crate or coop below the body.

6. In an apparatus for the purpose described, the combination with a frame, a body connected with the frame and having an opening at one end for connecting its interior with that of a chicken house and also having an opening in its bottom through which chickens can pass into a crate or coop positioned below the body, an auxiliary frame located below the body, cranked shafts journaled in the frame and auxiliary frame, a frame mounted on and movable by the cranks of the shafts toward and from the bottom of the body, a handle on one shaft, and means for coöperating with said handle to adjustably fix the same in position to hold a crate against the bottom of the body.

In testimony whereof I have hereunto set my hand in presence of two subscribing witnesses.

JAMES DE YOUNG.

Witnesses:
W. A. NICOLET,
J. C. EWING.